(12) United States Patent
Venkataraman

(10) Patent No.: US 11,520,394 B2
(45) Date of Patent: Dec. 6, 2022

(54) NETWORK PROCESSOR FPGA (NPFPGA): MULTI-DIE-FPGA CHIP FOR SCALABLE MULTI-GIGABIT NETWORK PROCESSING

(71) Applicant: Altera Corporation, San Jose, CA (US)

(72) Inventor: Krishnan Venkataraman, Pleasanton, CA (US)

(73) Assignee: Altera Corporation, San Jose, CA (US)

( * ) Notice: Subject to any disclaimer, the term of this patent is extended or adjusted under 35 U.S.C. 154(b) by 398 days.

(21) Appl. No.: 15/889,566

(22) Filed: Feb. 6, 2018

(65) Prior Publication Data

US 2018/0164865 A1 Jun. 14, 2018

Related U.S. Application Data

(63) Continuation of application No. 13/921,364, filed on Jun. 19, 2013, now Pat. No. 9,886,072.

(51) Int. Cl.
*G06F 1/00* (2006.01)
*G06F 1/32* (2019.01)
*G06F 1/329* (2019.01)

(52) U.S. Cl.
CPC .............. *G06F 1/32* (2013.01); *G06F 1/329* (2013.01); *Y02D 10/00* (2018.01)

(58) Field of Classification Search
CPC ...................................................... G06F 1/32
See application file for complete search history.

(56) References Cited

U.S. PATENT DOCUMENTS

| 7,533,382 | B2 | 5/2009 | Karim |
| 8,001,433 | B1* | 8/2011 | Bhatia ............ G01R 31/318575 |
| | | | 714/729 |
| 8,514,634 | B1* | 8/2013 | Wu .......................... G11C 8/16 |
| | | | 365/156 |
| 9,201,777 | B2* | 12/2015 | Hsu ......................... G06F 12/00 |
| 2005/0125793 | A1 | 6/2005 | Aguilar et al. |
| 2005/0198257 | A1* | 9/2005 | Gupta .................... G06F 1/3215 |
| | | | 709/224 |
| 2006/0064696 | A1 | 3/2006 | Lin et al. |
| 2006/0132481 | A1 | 6/2006 | Brett |

(Continued)

OTHER PUBLICATIONS

Large FPGA Methodology Guide, Including Stacked Silicon interconnect (SSI) Technology, UG872 (v14.3), Oct. 16, 2012, 64 pages.

(Continued)

*Primary Examiner* — Nitin C Patel
(74) *Attorney, Agent, or Firm* — Fletcher Yoder P.C.

(57) ABSTRACT

Systems and methods are provided for reducing power consumption of a multi-die device, such as a network processor FPGA (npFPGA). The multi-die device may include hardware resources such as FPGA dies, which may be coupled to NIC dies and/or memory dies. Power consumption of the multi-die device may be reduced by monitoring usage of hardware resources in the multi-die device, identifying hardware resources that are not in use, and gating power to the identified hardware resources. The status of processing elements (PEs) in the multi-die device may be tracked in a PE state table. Based on the PE state table, tasks from a task queue may be assigned to one or more processing elements.

23 Claims, 10 Drawing Sheets

(56) References Cited

U.S. PATENT DOCUMENTS

2008/0077928 A1    3/2008   Matsuzaki
2009/0194864 A1    8/2009   Dang et al.
2011/0154348 A1    1/2011   Elnozahy et al.
2013/0007413 A1    1/2013   Thomson

OTHER PUBLICATIONS

Kirk Saban, Xilinx Stacked Silicon Interconnect Technology Delivers Breakthrough FPGA Capacity, Bandwidth, and Power Efficiency, WP380 (v1.2), Dec. 11, 2012, 10 pages.

* cited by examiner

NETWORK PROCESSOR FPGA (NPFPGA): MULTI-DIE-FPGA CHIP FOR SCALABLE MULTI-GIGABIT NETWORK PROCESSING

CROSS-REFERENCE

This is a continuation, and claims the benefit of U.S. application Ser. No. 13/921,364, filed Jun. 19, 2013, the contents of which are incorporated by reference in their entirety.

FIELD OF THE DISCLOSURE

This disclosure relates to multi-die integrated circuit devices, such as field programmable gate array (FPGA) devices, and systems and methods for reducing power consumption of such devices.

BACKGROUND OF THE DISCLOSURE

Ethernet has become a widely used connectivity solution because of its scalability; speeds may range from sub-gigabit to multi-gigabit. Ethernet may be used for work stations, local area networks (LANs), wide area networks (WANs), metropolitan area networks (MANs), the Internet backbone, and data centers to perform computing, storage, and networking functions. Ethernet networking systems may vary in the nature of packet processing and traffic management functions depending on the application and standard requirements.

Packet processing, traffic management, and other network processing functions are often implemented using one or more discrete devices, which may be application-specific integrated circuit (ASIC) or off-the-shelf application specific standard product (ASSP) devices, software programmable network processor devices, or a combination of standard FPGAs. ASIC, ASSP, and network processor devices may be costly to develop or difficult to upgrade. Current FPGA implementations (e.g., use of multiple FPGA chips) may not offer or scale to the desired port density, aggregation, or wire speed throughput.

SUMMARY OF THE DISCLOSURE

In light of the above, the present disclosure relates to a multi-die device, such as a network processor FPGA (npFPGA), having FPGA dies and at least one network interface controller (NIC) die, and systems and methods for reducing power consumption of such a multi-die device. A multi-die device of the present disclosure allows implementation of scalable and user-definable network processing functions at wire speed, comparable to ASSP and ASIC devices. A multi-die device of the present disclosure may be targeted for a wide range of applications, similar to a hardwired ASIC or ASSP/network processor devices.

An npFPGA of the present disclosure may offer a significant advantage compared to traditional network processing hardware solutions in terms of scalability, system architecture flexibility, customization, and product differentiation. Compared to ASICs, an npFPGA may have a lower development cost and faster development cycle. Compared to ASSPs or network processors, an npFPGA allows more system architecture flexibility. Customers may easily integrate proprietary hardware and software to customize an npFPGA with a high degree of product differentiation, and an npFPGA may be easily upgraded. Compared to using multiple FPGA chips, an npFPGA may offer higher performance with low area utilization, offering high port density.

In accordance with embodiments of the present disclosure, there is provided an application specific multi-die device having a plurality of interconnected integrated circuit (IC) dies, which may be interconnected with through-silicon vias (TSVs) or on a traditional organic substrate, and an NIC die (e.g., Ethernet controller or Interlaken controller) coupled to one of the plurality of FPGA dies. One of the plurality of FPGA dies may be a system-on-chip (SoC) FPGA having an embedded multicore processor subsystem. The multi-die device may also include a memory die (e.g., SDRAM or SRAM) coupled to one of the plurality of IC dies. In some embodiments, one or more of the plurality of IC dies may be FPGA dies.

In accordance with additional embodiments of the present disclosure, there is provided a method for reducing power consumption of a multi-die device, such as an npFPGA. Usage of hardware resources (e.g., FPGA dies, NIC dies, memory dies, or processing elements implemented within the FPGA fabric) in the multi-die device may be monitored. One of the hardware resources that is not in use may be identified, and control circuitry may be used to gate power to the identified hardware resource.

In accordance with additional embodiments of the present disclosure, there is provided a system for reducing power consumption of a multi-die device having multiple processing elements (PEs) implemented within the FPGA fabric. A function scheduler associated with a group of the PEs may monitor task requests from a task queue, assign a task from the task queue to one of the PEs in the group, monitor progress of the assigned task, and post a result in an output descriptor queue when the assigned task has been completed. The function scheduler may gate power to unused PEs in the group.

BRIEF DESCRIPTION OF THE FIGURES

Further features of the disclosure, its nature and various advantages will be apparent upon consideration of the following detailed description, taken in conjunction with the accompanying drawings, in which like referenced characters refer to like parts throughout, and in which.

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments; however, the figures may not necessarily not show and may not be intended to show the exact layout of the hardware components contained in the embodiments. The figures are provided merely to illustrate the high-level conceptual layouts of the embodiments. The embodiments disclosed herein may be implemented with any suitable number of components and any suitable layout of components in accordance with principles known in the art.

Figure 1:
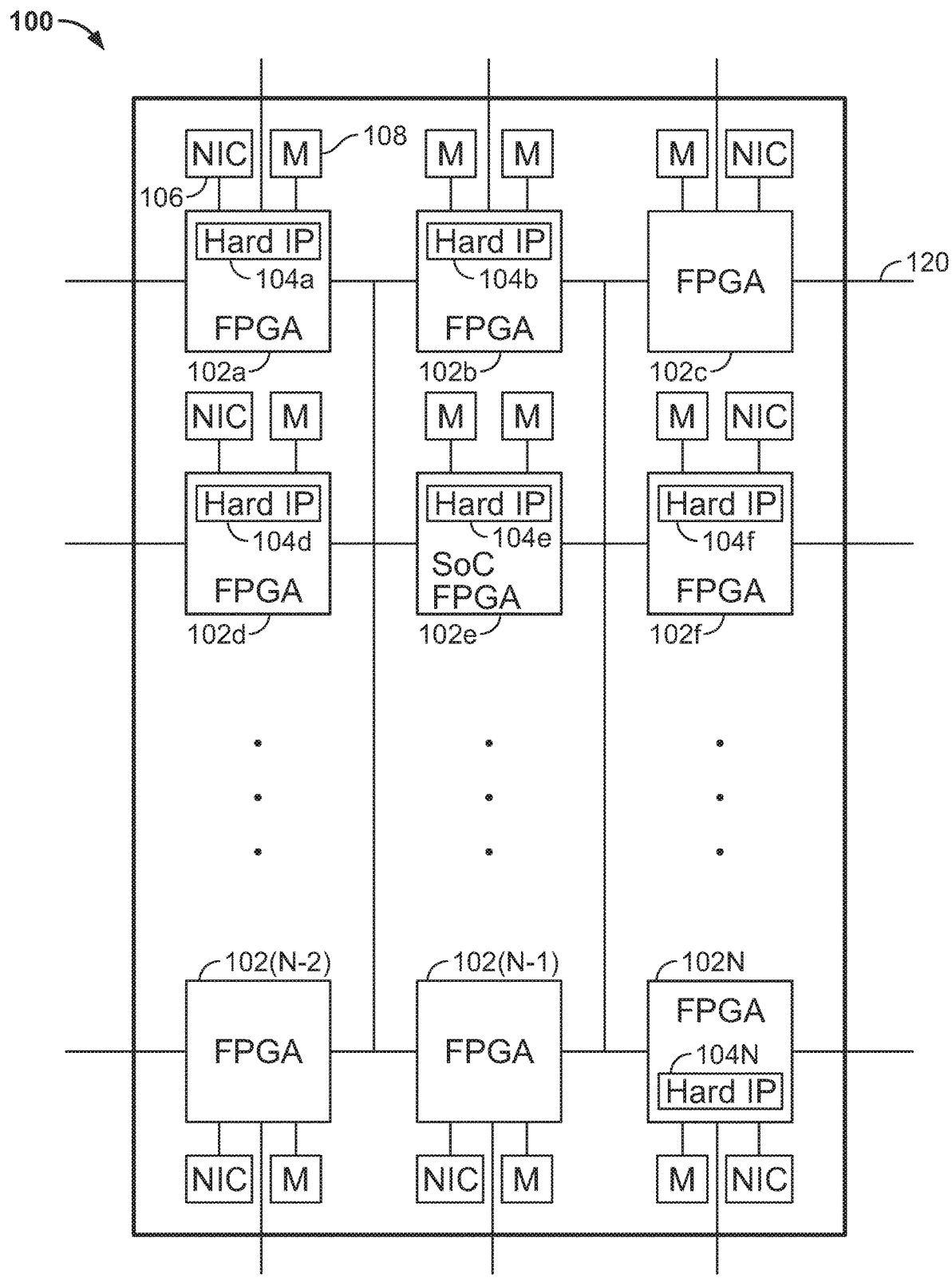
FIG. 1 is a block diagram of a multi-die device having a plurality of FPGA dies, according to an illustrative embodiment.

FIG. 1 is a block diagram of a multi-die device 100 having a plurality of FPGA dies, according to an illustrative embodiment. In some embodiments, device 100 may be a generic network processor FPGA (npFPGA). Device 100 may contain N FPGA dies 102a-102N interconnected with passive and active through-silicon vias (TSVs) or on a traditional organic substrate. One or more FPGA dies of device 100 may be configured with software intellectual property (soft IP) and/or user logic. FPGA dies 102a-102N may appear as a single logic array fabric (also referred to herein as FPGA fabric or logic fabric) for the user logic. That is, multiple FPGA dies may be configured or programmed together to function as a single FPGA die. The number of FPGA dies (i.e., N) in device 100 may be limited by the physical size of the npFPGA integrated circuit (IC) size. FPGA dies along an external edge of device 100 may have one or more user configurable external I/Os (e.g., I/O 120).

Although multi-die device 100 is shown as having a plurality of FPGA dies, it should be understood that device 100 and other multi-die devices discussed herein may have other types of integrated circuit (IC) dies instead of or in addition to FPGA dies. It should also be understood that the systems and methods discussed herein as applying to FPGA dies may be equally applicable to IC dies of other types, such as application-specific integrated circuits (ASICs), application specific standard products (ASSPs), and other programmable logic devices (PLDs). For example, in some embodiments, dies 102a-102N of device 100 may be ASIC and/or off-the-shelf ASSP dies. In some embodiments, device 100 and/or any other multi-die device discussed herein may have a combination of FPGA and ASIC/ASSP dies, assuming such FPGA and ASIC/ASSP dies have compatible electrical interfaces.

One or more FPGA dies of device 100 may be embedded with hardware intellectual property (hard IP) 104a-104N, which may include a layout of reusable hardware having a specified application function. An FPGA die in device 100 may have one or more types of hard IP. Types of hard IP may include Serializer/Deserializer (SerDes), bus interfaces such as Peripheral Component Interconnect Express (PCie), embedded memory controllers, embedded bus controllers (e.g., Advanced eXtensible Interface (AXI)), FPGA interconnect interface input/output (FIF), and embedded processor subsystem. One or more FPGA dies of device 100 may be a system-on-chip (SoC) FPGA (e.g., SoC FPGA 102e), whose hard IP (e.g., hard IP 104e) may include an embedded multicore processor subsystem. The embedded multicore processor subsystem may serve as a control processor for the target system of device 100.

Device 100 may include network interface controller (NIC) dies, such as Ethernet, media access control (MAC), Interlaken, Optical Transport Network (OTN), and/or security algorithm engines. One or more FPGA dies in device 100 may be tightly coupled to one or more NIC dies (e.g., NIC die 106), which provide the network personality for an npFPGA. NIC dies may implement standard-based network interface transport protocol functions (e.g., Ethernet, OTN, or Interlaken), or implement hardware acceleration engines to support standard-based functions (e.g., security algorithms or video processing functions). For example, an NIC die may be an Ethernet MAC controller, OTN Framer/Mapper/Bridge controller, or Interlaken protocol controller. NIC dies may provide data path offload functions such as packet header extraction and insertion, checksum computation, etc. Although Ethernet and Interlaken are used as examples of NICs when describing architectures herein, it should be understood that other NICs may be used to provide interfaces/functions for other networking technologies and applications.

NICs may terminate interface layers and extract packet streams into the FPGA fabric. Standard NICs may be selected for coupling with FPGAs of device 100 so that a user of device 100 may configure (e.g., program) FPGAs for data (e.g., packet) processing without having to implement standard interfaces. For example, an NIC interface may be implemented with a simple first-in, first-out (FIFO) datapath interface and an optional master direct memory access (DMA) controller. The DMA controller may offload user logic in the data movements and provide data handlers in the form of packet descriptors to the user logic to perform packet processing and flow processing functions. The FPGA fabric may be configured with user logic that implements the necessary network processing functions required for a target system application. Received packets may be processed and forwarded to output queues, as discussed further with respect to FIG. 5. The user logic may implement necessary scheduling and service algorithms based on the target application and signal a transmit DMA in an NIC to transfer data to the network interface.

Device 100 may also include one or more memory dies, such as high speed serial or parallel memory dies. One or more FPGA dies in device 100 may be tightly coupled to one or more memory dies (e.g., memory die 108), which may include serial Hybrid Memory Cube (HMC) or parallel synchronous dynamic random-access memory (SDRAM), double data rate (DDR)/quadruple data rate (QDR) static random-access memory (SRAM), and/or ternary content-addressable memory (TCAM). For example, an FPGA die in device 100 may be tightly coupled with high speed serial SDRAM (e.g., HMC DRAM devices) for packet data storage, and with one or more parallel SRAMs for control information.

Figure 2:
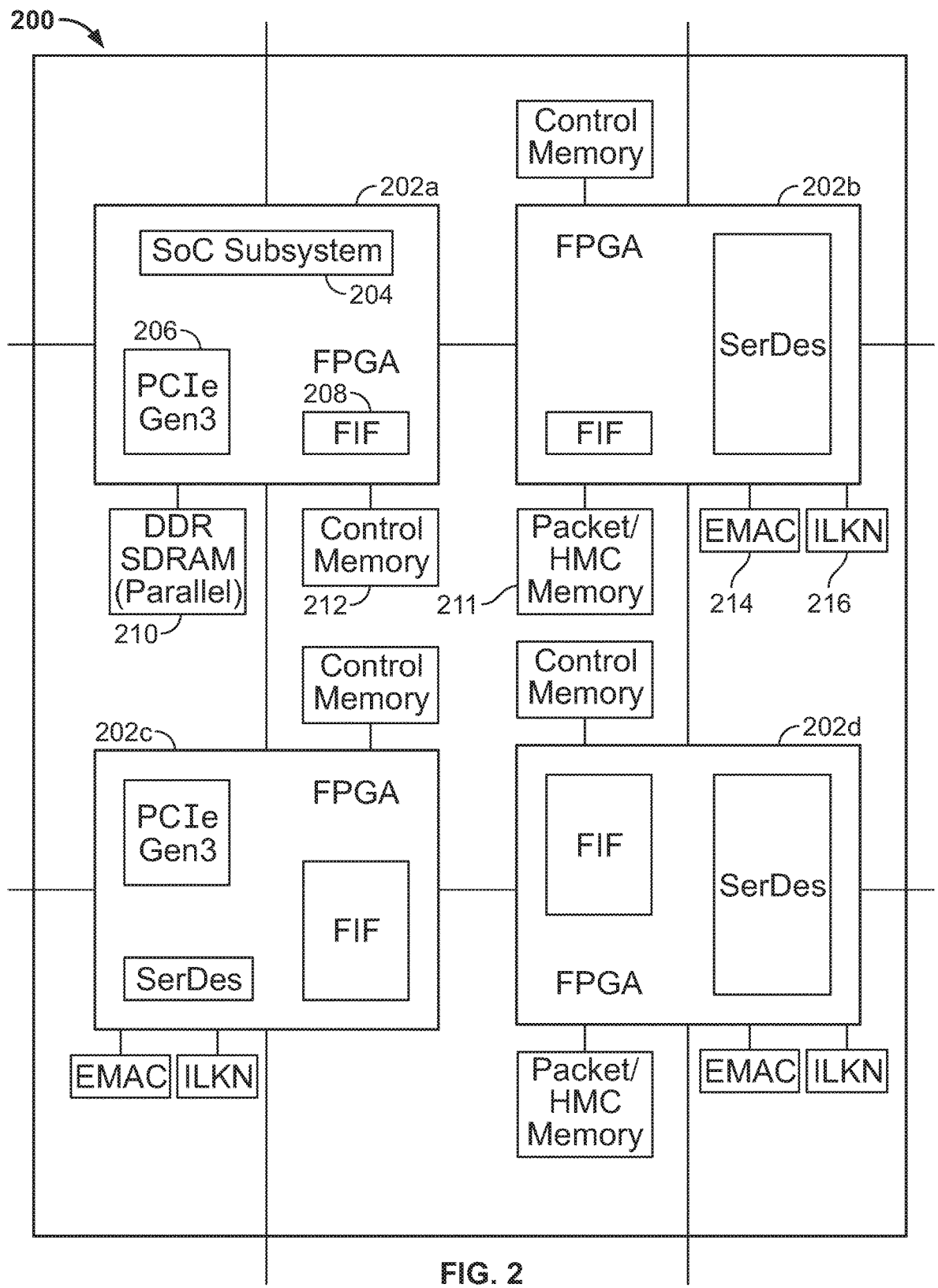
FIG. 2 is a block diagram of a multi-die device with Ethernet and Interlaken interfaces, according to an illustrative embodiment.

FIG. 2 is a block diagram of a multi-die device 200 with Ethernet and Interlaken interfaces, according to an illustrative embodiment. Device 200 may have an SoC FPGA die 202*a* and three other FPGA dies 202*b*, 202*c*, and 202*d*. Interconnected FPGA dies 202*a*-202*d* (e.g., with TSVs) may serve as a single logic fabric, configurable with user logic or soft IPs. FPGA dies 202*a*-202*d* may have embedded hard IPs, such as SerDes, PCie (e.g., PCie Gen3 206), and FIF (e.g., FIF 208). The SerDes, PCie, and FIF hard IP in device 200 may implement custom functions to provide high speed SerDes or transceiver (scalable from gigabit rates to multi-gigabit rates to support 100G/400G network interfaces and serial interconnects) interfaces, standard PCie bus interfaces, and FIF I/Os for die interconnections, respectively. In some embodiments, FPGA dies 202*a*-202*d* may be embedded with hard memory controller IPs to simplify user logic and maximize the memory interface bandwidth utilization.

Hard IP in SoC FPGA die 202*a* may include an SoC subsystem 204, which may be a multi-core ARM SoC subsystem. SoC subsystem 204 may include an embedded processor that may be used in lieu of a processor external to device 200. SoC subsystem 204 may also include embedded memory, which along with the embedded processor may be used to implement software functions.

Device 200 may be an npFPGA that is a more specific example of device 100 of FIG. 1. For example, FPGA die 202*a* of device 200 may be a more detailed diagram of FPGA die 102*e* of device 100. Hard IP 104*e* in SoC FPGA die 102*e* of device 100 may include SoC Subsystem 204, PCie Gen3 206, and FIF 208 shown in SoC FPGA die 202*a* of device 200.

Device 200 may include one or more memory dies, such as parallel DDR SDRAM die 210 and control memory die 212 coupled to SoC FPGA die 202*a*, and HMC memory die 211 coupled to FPGA die 202*b*. One or more SDRAM dies in device 200 may be an off-the-shelf standard product used for embedded processor data storage. One or more HMC memory dies in device 200 may be an off-the-shelf high speed serial SDRAM standard product used for packet data queuing. One or more control memory dies in device 200 may be QDR-based SRAM, an off-the-shelf standard product. Device 200 may also include one or more NIC dies, such as Ethernet media access control (EMAC) die 214 and Interlaken (ILKN) die 216 coupled to FPGA die 202*b*. EMAC and Interlaken NICs are further discussed with respect to FIGS. 3 and 4, respectively.

Figure 3:
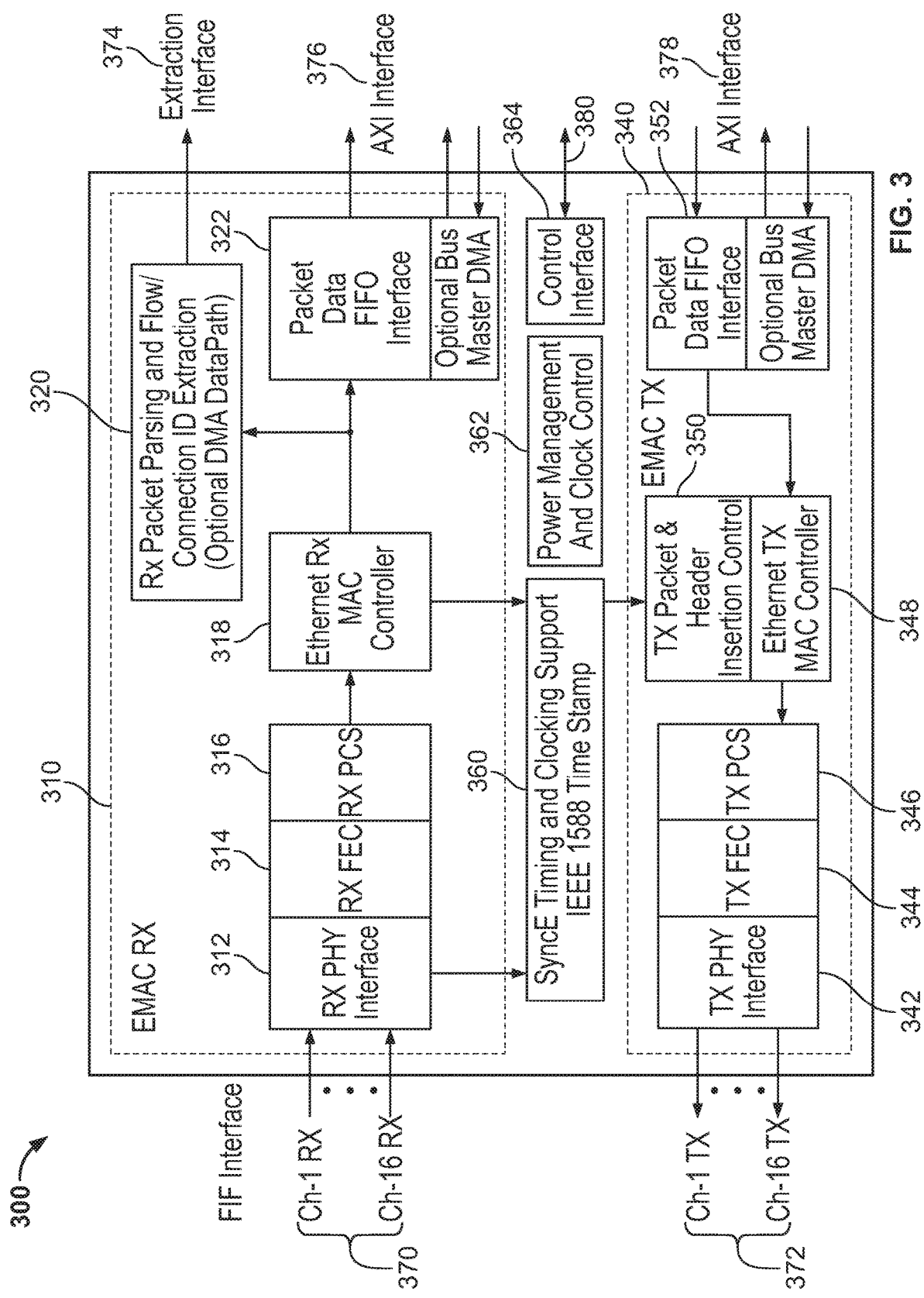
FIG. 3 is a block diagram of an Ethernet media access control (EMAC) controller, according to an illustrative embodiment.

FIG. 3 is a block diagram of an EMAC controller 300, according to an illustrative embodiment. EMAC controller 300 may be a custom die that implements a multirate, multichannel Ethernet MAC controller scalable from 10 Gbps to 400 Gbps. One or more NIC dies in device 200 of FIG. 2, such as EMAC die 214, may be an instance of EMAC controller 300.

EMAC controller 300 may support up to 16 independent channels. For example, RX PHY interface 312 of EMAC controller 300 may have receive interface channels 1×400G, 4×100G, 4×40G, and/or 16×10G. TX PHY interface 342 of EMAC controller 300 may have transmit interface channels 1×400G, 4×100G, 4×40G, and/or 16×10G. Receive interface signals 370 and transmit interface signals 372 of EMAC controller 300 may be serviced directly from an embedded SerDes within EMAC controller 300 or from an FPGA die through an FIF interface.

EMAC controller 300 may include EMAC receiver (EMAC RX) 310, EMAC transmitter (EMAC TX) 340, power management and clock control functions 362, and control interface 364 for user control and EMAC configuration through control bus 380. In some embodiments, control bus 380 may be an AXI-lite bus. EMAC controller 300 may also include additional functions, represented by block 360, to support SyncE and IEEE1588 standard requirements.

EMAC RX 310 may implement the Ethernet standard required RX Forward Error Correction (FEC) 314, RX Physical Coding Sublayer (PCS) 316, and Media Access Controller (MAC) 318, functions, Rx packet parser 320, and RX packet FIFO 322 with an optional master DMA interface. Packets received by EMAC RX 310 may be delivered directly to user-allocated receive buffer memory through AXI interface 376. Parser extractions may be delivered through a dedicated extraction interface 374, or may be written directly into a packet descriptor queue through DMA.

EMAC TX 340 may receive packets for transmission through AXI interface 378 into a TX staging FIFO 352. TX staging FIFO 352 may use a master DMA controller to transfer the transmit packets directly from user-allocated transmit buffer memory. EMAC TX 340 may implement header insertion function 350, which may encapsulate packets from TX staging FIFO 352 with the standard required Ethernet frame headers and trailers. The Ethernet frame transmission may be controlled by Ethernet standard compliant MAC function 348. EMAC TX 340 may also implement the standard required transmit PCS 346 and FEC 344 functions.

Figure 4:
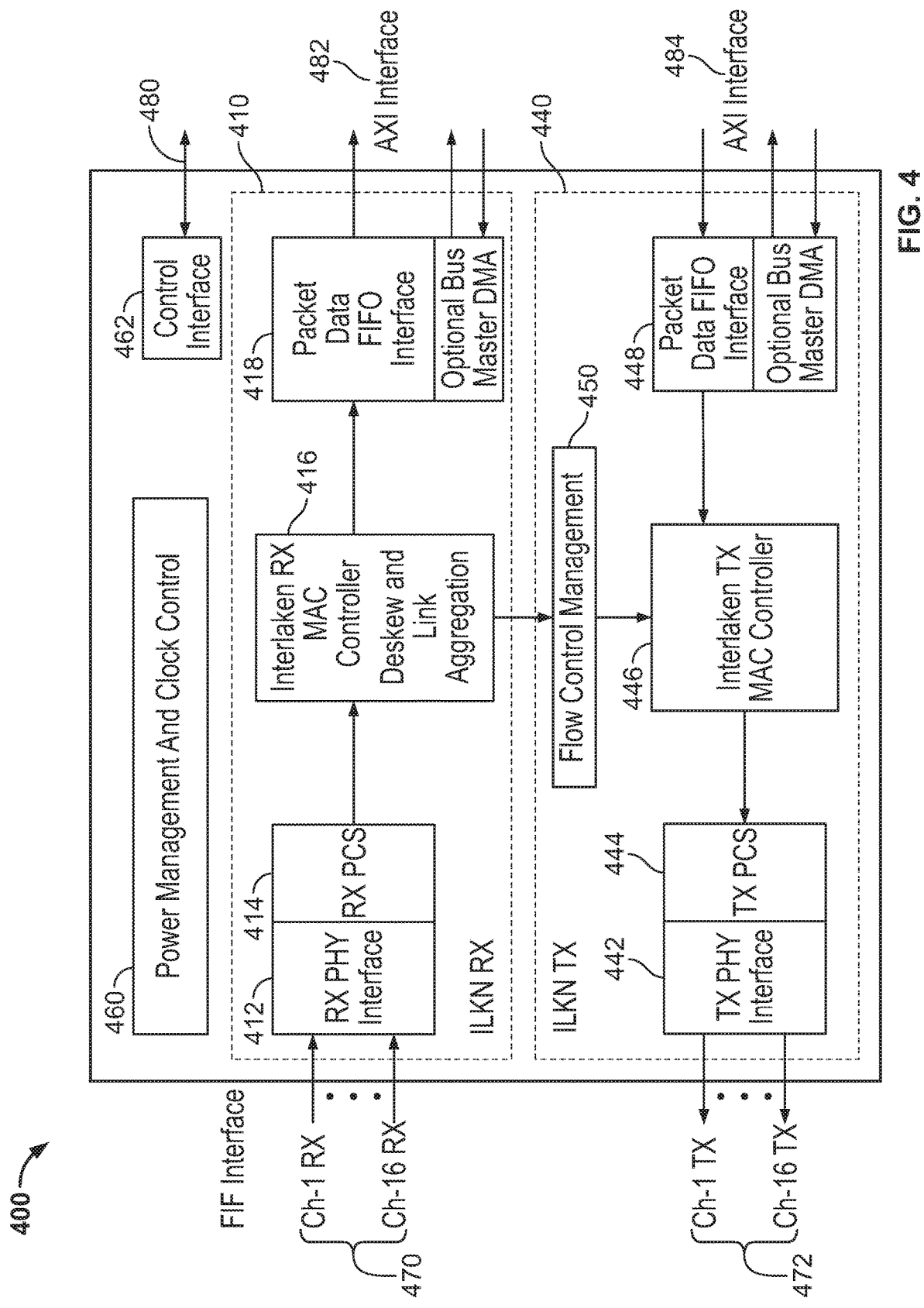
FIG. 4 is a block diagram of an Interlaken (ILKN) physical coding sublayer (PCS)/MAC controller, according to an illustrative embodiment.

FIG. 4 is a block diagram of an Interlaken (ILKN) physical coding sublayer (PCS)/MAC controller 400, according to an illustrative embodiment. One or more NIC dies in device 200 of FIG. 2, such as ILKN die 216, may be an instance of ILKN controller 400. In some embodiments, ILKN controller 400 may be a custom die that implements a scalable Interlaken protocol controller to support aggregated link/packet interface rates up to 400G using up to 16 serial lanes. For example, RX PHY interface 412 of ILKN controller 400 may have receive interface lanes 16×12.5G or 16×25G. TX PHY interface 442 of ILKN controller 400 may have transmit interface lanes 16×12.5G or 16×25G. Receive interface signals 470 and transmit interface signals 472 of ILKN controller 400 may be serviced directly from an embedded SerDes within ILKN controller 400 or from an FPGA die through an FIF interface.

ILKN controller 400 may include ILKN receiver (ILKN RX) 410, ILKN transmitter (ILKN TX) 440, power management and clock control functions 460, and control interface 462 for user control and ILKN configuration through control bus 480. In some embodiments, control bus 480 may be an AXI-lite bus. ILKN RX 410 may collect per channel status information and provide the information to flow control management block 450, which may control per channel data transfers on ILKN TX 440. ILKN RX 410 may implement Interlaken per lane receive framing layer functions, represented by RX PCS 414, and store received per lane data streams into an RX data FIFO maintained in RX MAC 416. RX MAC 416 may implement receive Interlaken protocol layer functions including lane deskewing and aggregation. An aggregated link receive packet data stream may be delivered through RX FIFO interface controller 418, optionally with a master DMA controller. The received packets may be delivered directly to user-allocated receive buffer memory through AXI interface, 482.

ILKN TX 440 may receive packets for transmission through AXI interface 484 into a TX staging FIFO 448. TX staging FIFO 448 may use a master DMA controller to transfer the transmit packets directly from user-allocated transmit buffer memory. ILKN TX 440 may implement Interlaken transmit protocol layer functions TX MAC 446, which may create packet word bursts with appropriate Interlaken specific burst control words and distribute the burst words over multiple transmit lanes. TX PCS 444 may implement per lane Interlaken framing layer functions, which may insert Interlaken specific frame synchronization control words, scrambler state words, and other control words required for creating the Interlaken frame. The Ethernet frame transmission may be controlled by Interlaken standard compliant TX PCS 444 and TX MAC 446 functions.

In some embodiments, EMAC controller 300 and/or ILKN controller 400 may be interconnected to an FPGA die (e.g., FPGA die 202b of FIG. 2) using FIF I/O signals. The FIF interface may be protocol agnostic generic high speed electrical I/Os based on a JADEC I/O standard (e.g., JC42.2). For example, EMAC controller 300 and ILKN controller 400 may implement AXI4-stream and AXI4-lite interfaces for control bus and DMA master interfaces, respectively.

Figure 5:
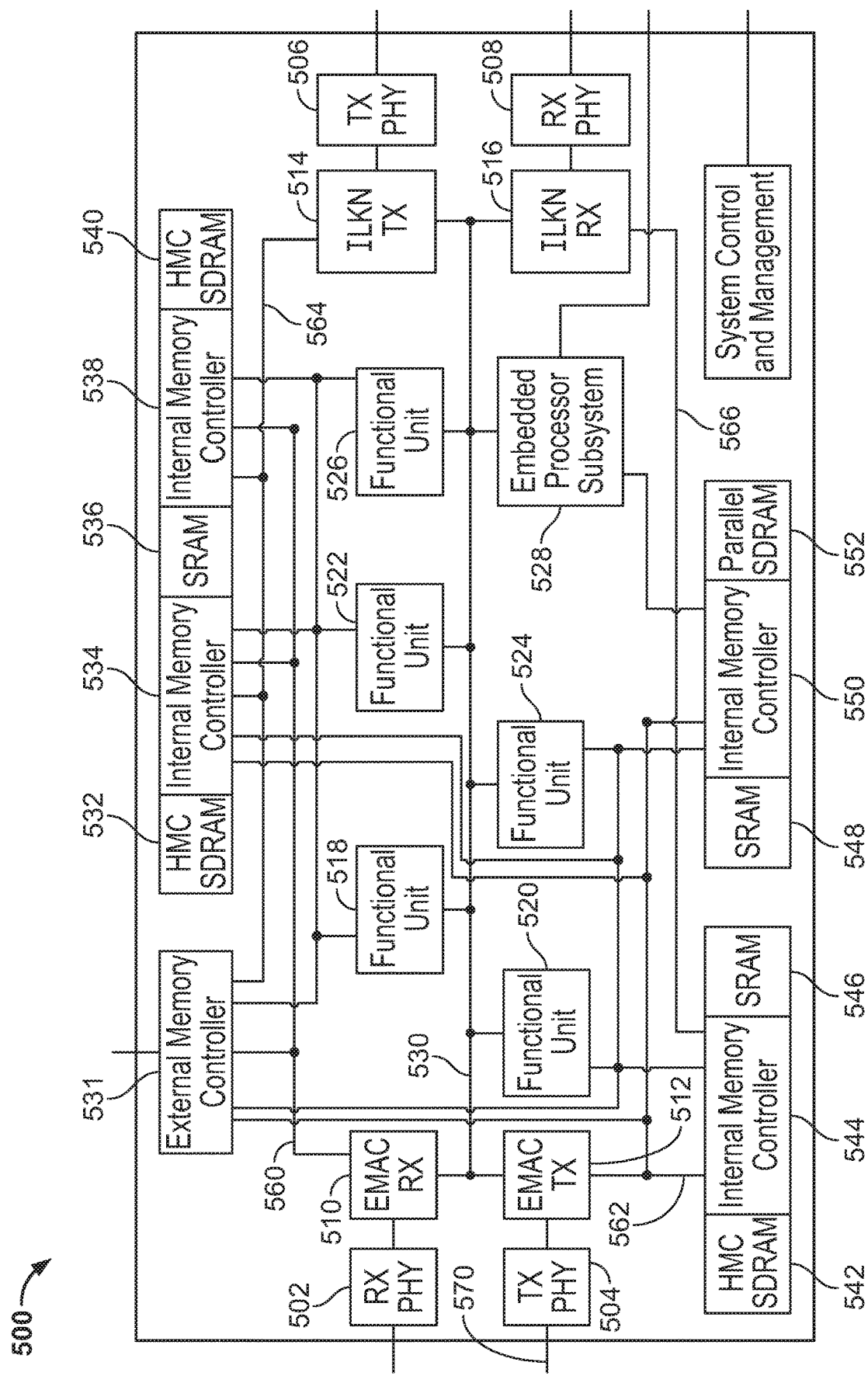
FIG. 5 is a functional view of a multi-die device in a network line card application, according to an illustrative embodiment.

An npFPGA device, such as device 200, integrated with EMAC and ILKN dies, such as EMAC controller 300 and ILKN controller 400, may be used in various system applications. FIG. 5 is a functional view of a multi-die device 500, an npFPGA, in a network line card application, according to an illustrative embodiment. The FPGA fabric within multi-die device 500 may be configured with user logic to implement the network processing functions required for a network line card.

In multi-die device 500, EMAC RX 510 and EMAC TX 512 may represent the receive EMAC controller functions 310 and transmit EMAC controller functions 340, respectively, of EMAC controller 300. ILKN RX 516 and ILKN TX 514 may represent the receive Interlaken controller functions 410 and transmit Interlaken controller functions 440, respectively, of ILKN controller 400. EMAC and ILKN network interface controllers may use bus master DMA controllers to offload user logic in data movements. Thus, user logic may operate on packet data using descriptors and packet data pointers.

In the receive direction, packets received from Ethernet interface RX PHY 502 may be parsed by EMAC controller EMAC RX 510 to extract header information. An EMAC parser may support all of the standard protocols, such as Ethernet, Virtual Local Area Network (VLAN), Multiprotocol Label Switching (MPLS), Internet Protocol version 4 (IPv4), Internet Protocol version 6 (IPv6), and Transmission Control Protocol (TCP)/User Datagram Protocol (UDP), and any user configurable bits over a configurable packet length. The parsed fields may be made available through a packet descriptor along with a packet pointer. EMAC RX 510 may maintain packet descriptor queues in internal SRAM 536, which may be accessed through internal memory controller 534. EMAC RX 510 may transfer received packet data through AXI bus 560 into packet data memory (also referred to herein as packet buffer memory) 532 or 540 through memory controller 534 or 538, respectively. At the 100 Gbps data rate, user logic may process at the rate of 14M to 200M packets per second, depending on the packet size, which may vary from 64 bytes to 9K jumbo frames. In order to sustain the wire speed rate, multi/parallel processing may be essential.

An npFPGA, with multiple FPGA dies appearing as a single logic array fabric, offers flexibility for configuring the FPGA fabric to process data. The FPGA fabric may be configured with user logic specific for a target system application, also referred to herein as a functional unit. The FPGA fabric may contain multiple instances of different functional units composed of an array of processing elements implementing pipelined parallel operations. For example, the functional view of a multi-die device 500 shown in FIG. 5 may illustrate functions of device 200, in which a physical FPGA die may implement multiple functions required for a line card application. It should be understood that the functional units shown in FIG. 5 may map anywhere into the FPGA dies shown in FIG. 2, and that FPGA software may make it transparent to a user which functions are mapped to which FPGA die.

On the line receive side (e.g., RX PHY 502 with EMAC RX 510), multiple classifier functions may be running in parallel to perform packet look-up and access control rule matching operations. A classifier functional unit (e.g., functional unit 518) may access packet descriptors from a descriptor queue maintained in internal SRAM 536, which may be accessed through internal memory controller 534. Using the packet header information from each packet descriptor, the classifier function may implement packet lookup operation using external TCAMs or user-defined hashing or search algorithms on an external SRAM or SDRAM through external memory controller 531 of multi-die device 500.

Receive traffic management (RX TM) functions may implement a metering or policing algorithm to monitor the rate at which data is received, and to enforce the quality of service (QoS) requirements according to a traffic contract defined for the flow. An RX TM functional unit e.g., functional unit 522) may implement congestion control and management functions that allow data packets to be tagged or dropped. A route functional unit (e.g., functional unit 526) may resolve packet forwarding requirements and add or modify packet headers to meet switching requirements. A forwarding packet descriptor queue may be maintained in internal SRAM 536, and the packets may be maintained in packet buffer memory 532 and 540. In the line card application example of FIG. 5, ILKN TX 514 may access received packet data from packet buffer memory 532 and 540 through AXI bus 564 and transfer the packets as an aggregated stream to the system through an Interlaken interface.

On the line transmit side (e.g., TX PHY 504 with EMAC TX 512), a channelized (e.g., packets may be on one or more TX channels or ports on TX interface 570) packet stream may be transmitted from the packet stream received from a system backplane via an Interlaken interface (e.g., RX PHY 508 and ILKN RX 516). ILKN RX 516 may have a master DMA controller that may transfer the packet data directly into transmit packet buffer memory 542 through AXI bus 566 and memory controller 544. A packet queue may be represented using descriptors maintained in internal SRAM 546, which may be accessed through memory controller 544.

A transmit traffic management(TX TM) functional unit (e.g., functional unit 520) may perform traffic shaping of traffic flow on an outgoing port (e.g., one or more physical TX channels or a virtual port on any physical TX channel on TX interface 570). EMAC TX 512 may use a DMA master controller to access transmit packet data directly from transmit packet buffer memory 542 through memory controller 544 and AXI bus 562. In some embodiments, an EMAC controller may add or modify a packet header or trailer and transmit a packet on a transmit line.

A queuing functional unit (e.g., functional unit 524) may perform packet data queuing on a per port or channel basis directly or indirectly using assigned packet header data. Each buffer channel data may be associated with a flow and egress physical port or channel. Based on flow parameters, optional modifications may be performed and queuing priority may be assigned. A queuing functional unit may schedule and manage queues as various functional units perform their tasks. For example, a first functional unit may add data to an output queue after completing a task, and a second functional unit may be assigned tasks from the same output queue. It should be understood that multiple output queues may be used as various functional units perform their functions, and that each output queue may be accessed by multiple functional units. It should be understood that "accessing" an output queue may involve adding data to the queue and/or removing data from the queue. The functional units may maintain various flow states, flow parameters, and queue status information on embedded SRAM 548, which may be accessed through internal memory controller 550.

Embedded processor subsystem 528 of multi-die device 500 may perform control plane functions that include flow configuration, diagnostics, network management support functions, and operations, administration, and management/maintenance(OAM). The embedded processor may use a dedicated program memory, SDRAM 552, through a dedicated internal memory controller 550. Embedded processor subsystem 528 may be communicatively coupled to EMAC RX 510, EMAC TX 512, ILKN TX 514, ILKN RX 516, and functional units 518, 520, 522, 524, and 526 via control bus 530. The classifier, RX TM, route, queuing, and TX TM functional units of FIG. 5 represent application specific functional units. It should be understood that additional functional units may exist other than those shown in FIG. 5, and that one or more NICs and/or functional units may be communicatively coupled to one or more controllers and/or memory blocks shown in FIG. 5 (e.g., via an AXI master bus). The internal memory controllers in multi-die device 500 may be soft or hard IP.

Figure 6:
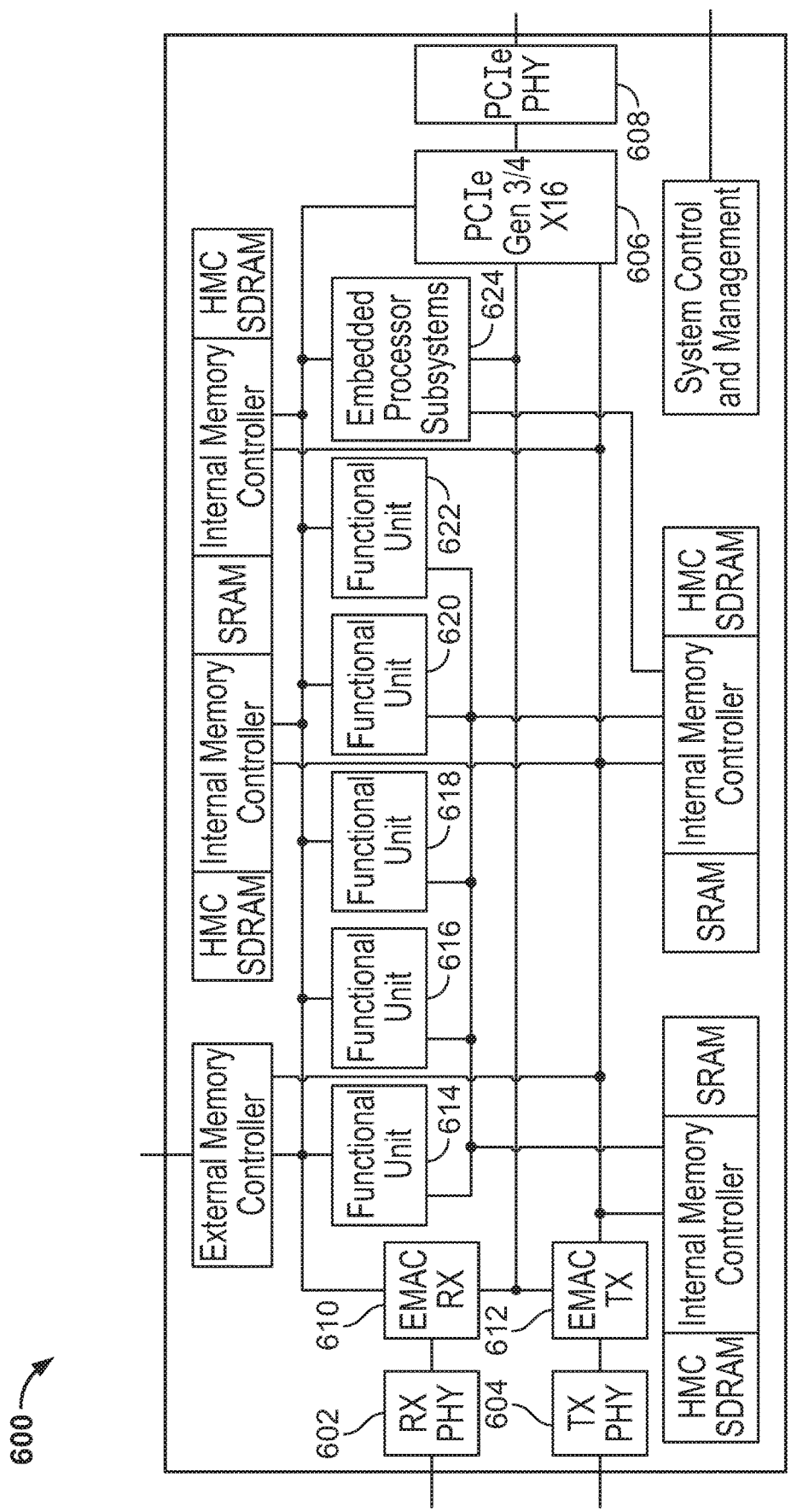
FIG. 6 is a functional view of a multi-die device in a server or network interface card controller application, according to an illustrative embodiment.

An npFPGA may be used for implementing a wide range of Ethernet network processing system applications, other than the line card application example of FIG. 5, by configuring the user logic. FIG. 6 is a functional view of a multi-die device 600 in a server or network interface card controller application, according to an illustrative embodiment. Multi-die device 600 may receive and transmit data via RX PHY 602 and TX PHY 604, respectively. Multi-die device 600 may be used in servers for convergence (Ethernet, Storage and management networks) and virtualization devices and network interfaces) applications.

The functional view of FIG. 6 may illustrate functions of a specific instance of device 100, which may be used for the aforementioned applications by programming suitable functional units onto one or more of FPGA dies 102*a*-102N. For example, functional unit 614 may perform data center bridging, functional unit 616 may perform TCP/IP processing, functional unit 618 may be a remote direct memory access (RDMA) protocol engine, functional unit 620 may be a Fiber Channel over Ethernet (FCoE) protocol engine, and functional unit 622 may be an Internet Small Computer System Interface (iSCSI) protocol engine. Functional units 614, 616, 618, 620, and 622 may be communicatively coupled to embedded processor subsystems 624 (e.g., of an SoC FPGA) and an external memory controller. Embedded processor subsystems 624 may be communicatively coupled to PCie Gen3/4 x16 606 and an NIC (e.g., EMAC RX 610 or EMAC TX 612) via a control bus. PCie Gen3/4 x16 606 and PCie PHY 608 may be included in one or more of hard IP 104*a*-104N of device 100.

It should be understood that additional functional units may exist other than those shown in FIG. 6, and that one or more NICs and/or functional units may be communicatively coupled to one or more controllers and/or memory blocks shown in FIG. 6 (e.g., via an AXI master bus). The internal memory controllers in multi-die device 600 may be soft or hard IP.

Typically, an FPGA has a much higher power consumption compared to ASIC or ASSP counterparts when used in a similar application. To reduce operational power consumption of an npFPGA, functional level power gating and/or logic level power gating may be used. In functional level power gating, when a system application is not using all of the resources in the npFPGA, power to all of the unused dies (e.g., FPGA, NIC, and/or memory) may be gated by user configuration. In some embodiments, all of the unused hard IPs in the FPGAs, including unused IOs/SerDes power, may be gated through user configuration.

In logic level power gating, power gating may be applied at the FPGA fabric level. The FPGA fabric may have a regular structure of logic elements. Each logic element may have a combinational unit, memory unit, and set of registers. The registers may always be powered, as the states are to be retained for continued operation of the system application. Power gating of memory units may be applied only if they are unused by the system application. The power gating may be applied on an individual combinational unit or in groups of combinational units. Unused combinational units may be power gated permanently. Combinational units that are in use may be controlled by the user to enter into a sleep mode (e.g., powered down) when the logic has no influence in the evaluated register states, and to enter a wake mode (e.g., powered up) when new register state conditions are to be evaluated.

Figure 7A:
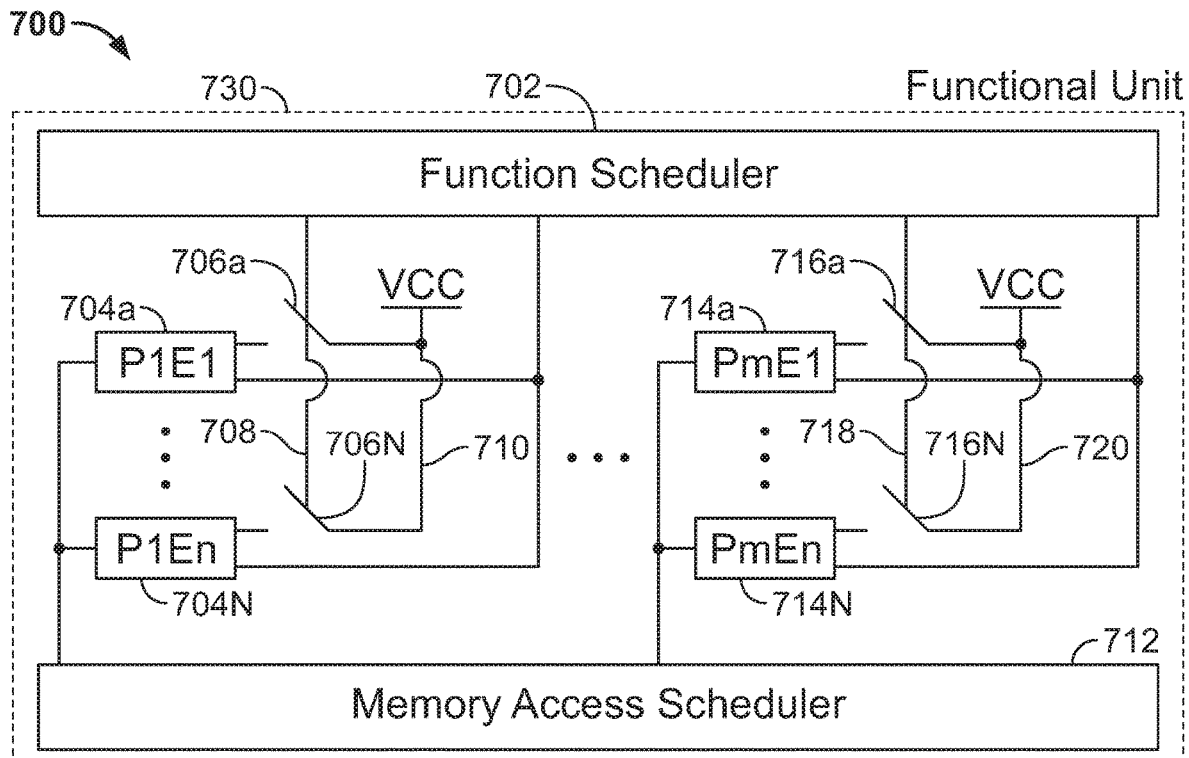
FIG. 7A is a block diagram of a structure with a central function scheduler that coordinates multiple parallel and pipeline stages, according to an illustrative embodiment.
Figure 7B:
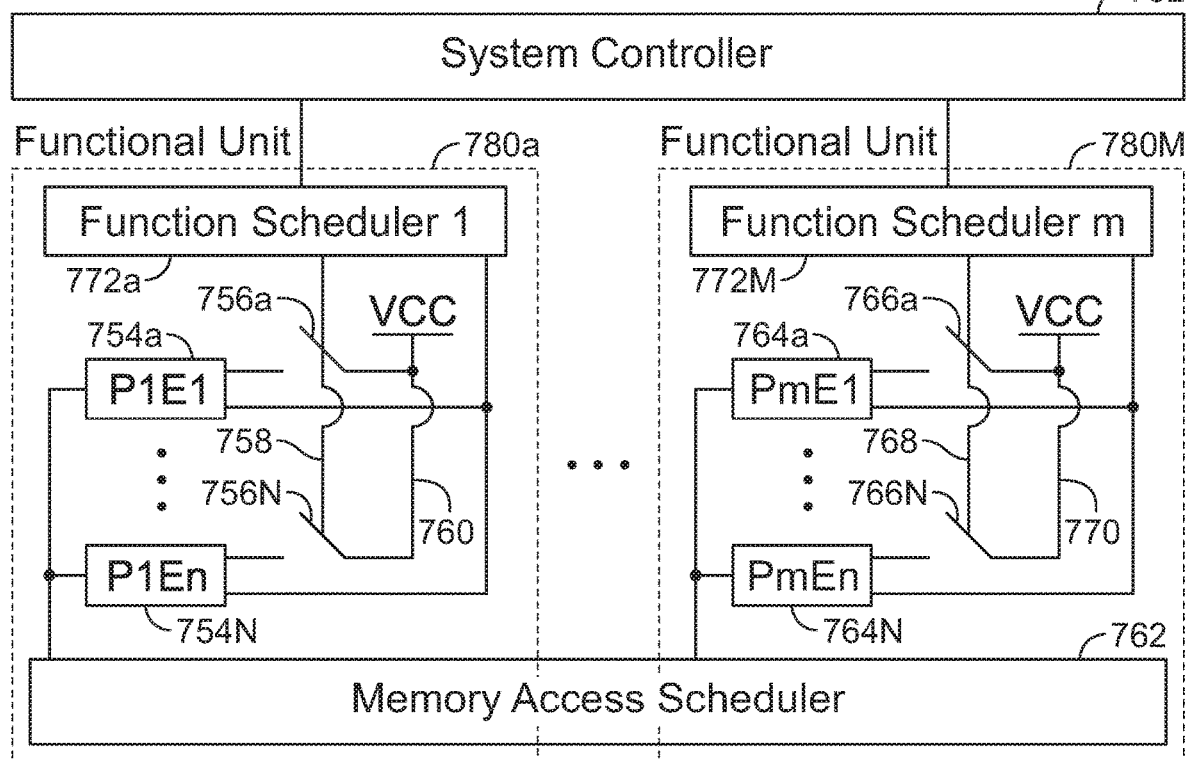
FIG. 7B is a block diagram of a structure with a central system controller that coordinates multiple independent function schedulers, according to an illustrative embodiment.

FIGS. 7A-B illustrate examples of different implementation structures of a functional unit with power gating capabilities. FIG. 7A is a block diagram of a structure 700 with a central function scheduler 702 that coordinates multiple parallel and pipeline stages, according to an illustrative embodiment. Structure 700 in its entirety may represent a functional unit 730. Structure 700 may have a plurality of processing elements(PEs) arranged in columns (e.g., m columns) and rows (e.g., n rows), where each PE may have an identifier made up of a 'P' followed by a number corresponding to the column number of the PE, then an 'E' followed by a number corresponding to the row number of the PE (e.g., P1E1 704*a* to P1En 704*n*, or PmE1 714*a* to PmEn 714N). The PEs in structure 700 may represent an array of some task (e.g., a table look-up task in a classifier). Function scheduler 702 may be communicatively coupled to each PE, and may schedule the tasks for each PE Each column of PEs may have different stages of a task that may be accomplished in a scheduled pipelined manner.

In structure 700 of FIG. 7A, function scheduler 702, which may always be on, may monitor task requests from a received descriptor queue and schedule each task to an available PE. Function scheduler 702 may monitor task completion and post results in a next stage descriptor queue for further processing. The PEs may access one or more memories while working on a task; memory access may be coordinated by memory access scheduler 712, which may be communicatively coupled to each PE in structure 700.

Each PE in structure 700 may have a switch (e.g., switches 706a-706N for PEs 704a-704N respectively, or switches 716a-716N for PEs 714a-714N respectively) controlled by function scheduler 702 via a respective control line (e.g., control line 708 for switches 706a-706N, or control line 718 for switches 716a-716N). When a switch is closed, it may connect a PE with a power rail (e.g., VCC 710 for PEs 704a-704N, or VCC 720 for PEs 714a-714N). Function scheduler 702 may gate power to one or more PEs (e.g., in logic level power gating) by opening switches for unused/idle PEs, disconnecting such PEs from a power rail.

FIG. 7B is a block diagram of a structure 750 with a central system controller 752 that coordinates multiple independent function schedulers 780a-780M, according to an illustrative embodiment. In FIG. 7B, system controller 752 may fork and combine packet life-cycle tasks in a given path. Structure 750 may have a plurality of processing elements(PEs) arranged in columns (e.g., m columns) and rows (e.g., n rows), where each PE may have an identifier made up of a 'P' followed by a number corresponding to the column number of the PE, then an 'E' followed by a number corresponding to the row number of the PE (e.g., P1E1 754a to P1En 754n, or PmE1 764a to PmEn 764N). The PEs in structure 750 may represent an array of some task (e.g., a table look-up task in a classifier). Each column of PEs in structure 750 may have its own function scheduler 772a-772M, each of which may be communicatively coupled to the PEs in its column and may schedule the tasks (e.g., from a received descriptor queue) for such PEs. Function schedulers 772a-772M may be communicatively coupled to system controller 752. Each column of PEs may have different stages of a task that may be accomplished in a scheduled pipelined manner.

In structure 750 of FIG. 7B, each of function schedulers 772a-772M may be turned on and off by system controller 752 based on which columns of PEs are assigned tasks or idle. Function schedulers 772a-772M may monitor task completion for their respective PEs and post results in a next stage descriptor queue for further processing. The PEs may access one or more memories as tasks are completed; memory access may be coordinated by memory access scheduler 762, which may be communicatively coupled to each PE in structure 750.

Each PE in structure 750 may have a switch (e.g., switches 756a-756N for PEs 754a-754N respectively, or switches 766a-766N for PEs 764a-764N respectively) controlled by a function scheduler 772a-772M via a respective control line (e.g., control line 758 for switches 756a-756N, or control line 768 for switches 766a-766N). When a switch is closed, it may connect a PE with a power rail (e.g., VCC 760 for PEs 754a-754N, or VCC 770 for PEs 764a-764N). Function schedulers 772a-772M may gate power to one or more PEs (e.g., in logic level power gating) by opening switches for unused/idle PEs, disconnecting such PEs from a power rail. Each function scheduler with its associated PEs, switches, and power rail may comprise a functional unit (e.g., functional unit 780a or functional unit 780M). A functional unit of structure 750 may correspond to physical parts (e.g., of an npFPGA) to which a function scheduler may gate power (e.g., turn off) when the functionality is not being used.

Figure 8:
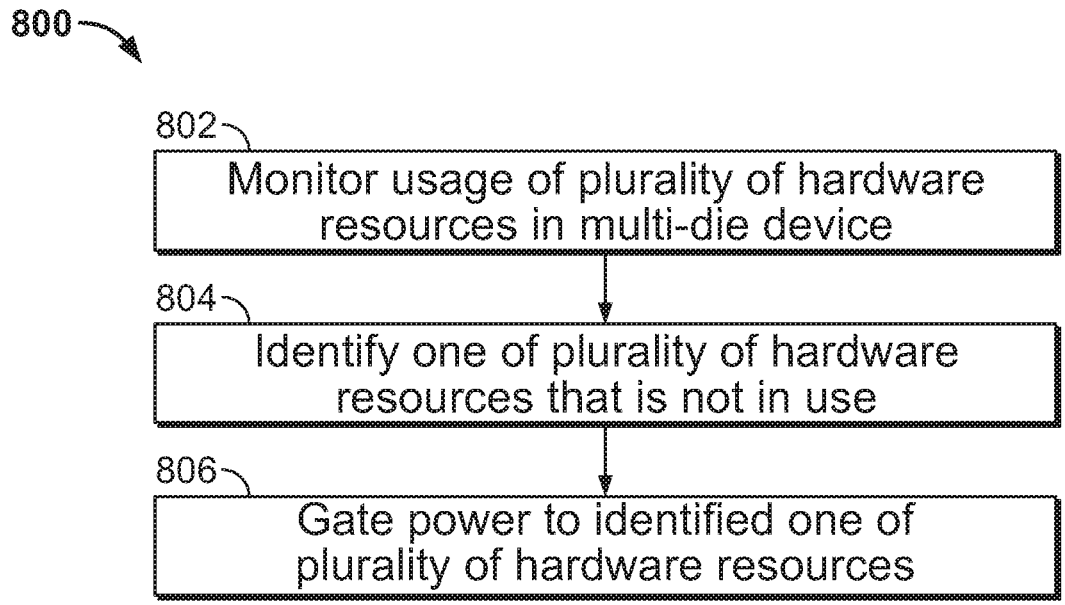
FIG. 8 shows an illustrative flow diagram of a process for reducing power consumption of a multi-die device, according to an illustrative embodiment.

FIG. 8 shows an illustrative flow diagram of a process 800 for reducing power consumption of a multi-die device, according to an illustrative embodiment. Process 800 may apply to functional level power gating as well as to logic level power gating for an npFPGA. Process 800 may be performed by one or more function schedulers (e.g., function scheduler 702 and/or function schedulers 772a-772M). For example, function schedulers 772a-772M, which may be coordinated by system controller 752, may perform process 800 in parallel or simultaneously for PEs in respective functional units.

At 802, usage of a plurality of hardware resources in a multi-die device (e.g., device 100 or device 200) may be monitored. Hardware resources may include FPGA dies, NIC dies, memory dies, hard IP (e.g., embedded in an FPGA die), processing elements, and/or combinational units in a logic element (e.g., of an FPGA die). Hardware resources may perform one or more tasks assigned by a function scheduler (e.g., function scheduler 702 or function schedulers 772a-772M).

At 804, one of the plurality of hardware resources that is not in use may be identified. The identification at 804 may be made based on a PE state table, as discussed further with respect to FIG. 10. The identified hardware resource may be one of an FPGA die, NIC die, memory die, hard IP (e.g., embedded in an FPGA die), processing element, and combinational unit in a logic element (e.g., of an FPGA die). In some embodiments, process 800 may also involve partitioning a task into functional units, with each functional unit corresponding to a group of processing elements. The identified one of the plurality of hardware resources may be a group of processing elements.

At 806, power may be gated to the identified one of the plurality of hardware resources. The power gating may be performed by control circuitry of a function scheduler (e.g., function scheduler 702 and/or function schedulers 772a-772M). The control circuitry may be configured by user logic (e.g., user logic in one or more of FPGA dies 104a-104N of device 100, or in one or more of FPGA dies 202a-202d of device 200).

Figure 9:
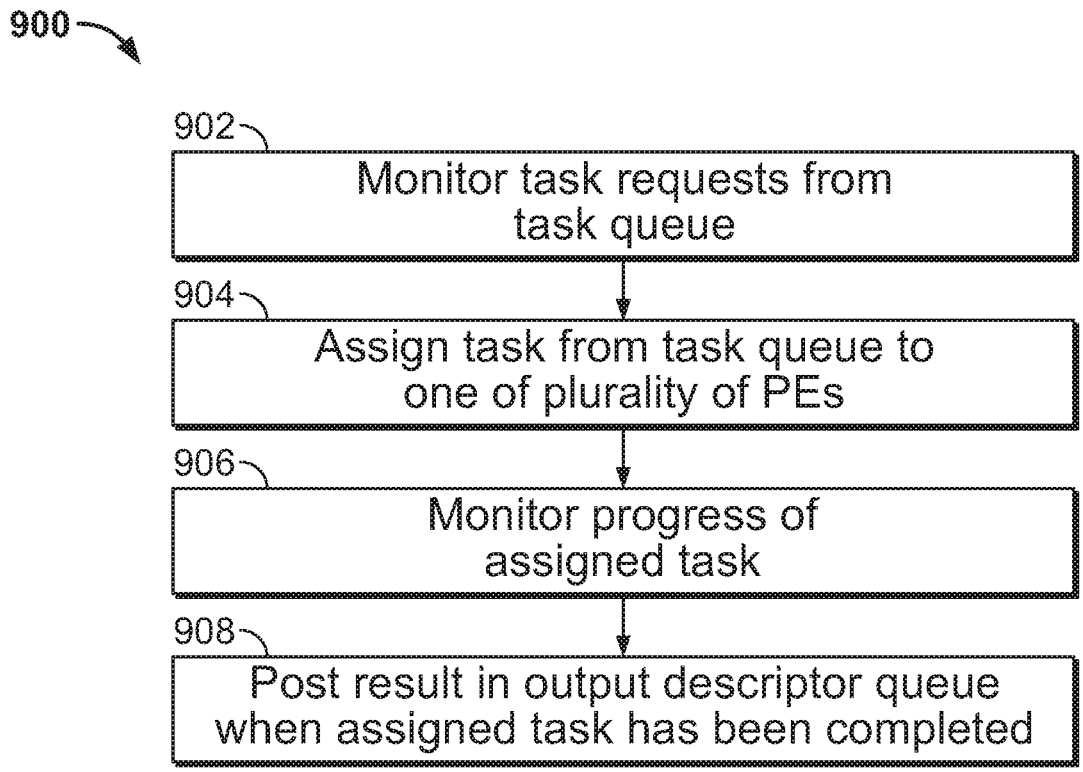
FIG. 9 shows an illustrative flow diagram of a process for coordinating task assignments and processing elements, according to an illustrative embodiment.

FIG. 9 shows an illustrative flow diagram of a process 900 for coordinating task assignments and processing elements, according to an illustrative embodiment. Process 900 may be continuously performed for all PEs by one or more function schedulers (e.g., function scheduler 702 and/or function schedulers 772a-772M). For example, function schedulers 772a-772M, which may be coordinated by system controller 752, may perform process 900 in parallel for PEs in respective functional units.

At 902, task requests from a task queue may be monitored. A task queue may be an output queue, discussed above with respect to FIG. 5. At 904, a task from the task queue may be assigned to one of a plurality of PEs. The plurality of PEs may be part of the same functional unit, as discussed above with respect to FIGS. 7A-B. The assignment at 904 may be made based on a PE state table (e.g., the task may be assigned to a PE, which the PE state table indicates is idle), as discussed further with respect to FIG. 10.

At 906, progress of the task assigned at 904 may be monitored. At 908, a result may be posted in an output descriptor queue when the assigned task (i.e., the task assigned at 904) has been completed. The output descriptor queue may be an output queue, and the posting may be controlled by a functional unit, as discussed above with respect to FIG. 5. In some embodiments, if no task is waiting in the task queue after a result is posted for a PE at 908, the PE may be powered down (e.g., power may be gated to the PE).

Figure 10:
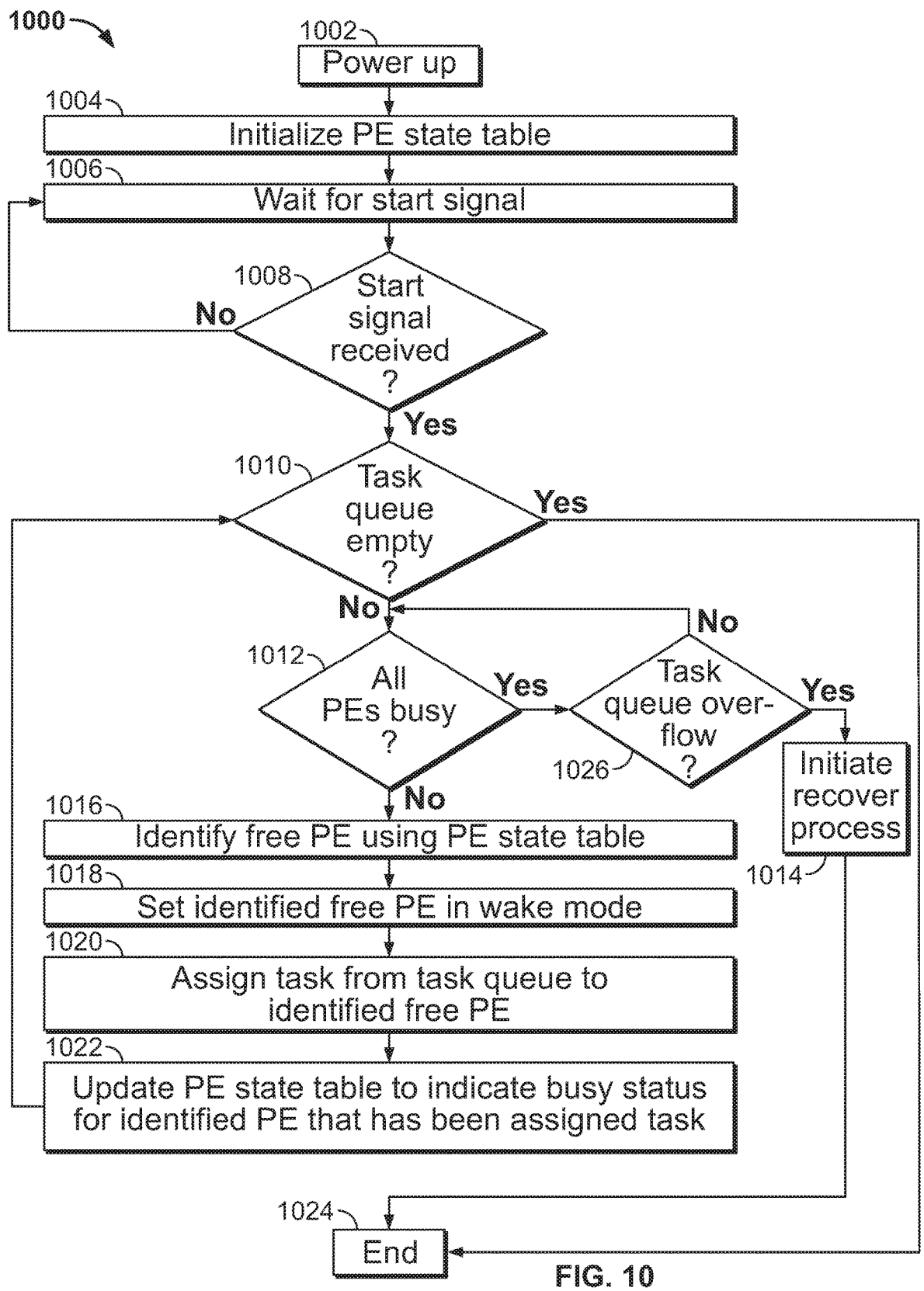
FIG. 10 shows an illustrative flow diagram of a process for assigning tasks to processing elements, according to an illustrative embodiment.

FIG. 10 shows an illustrative flow diagram of a process 1000 for assigning tasks to processing elements, according to an illustrative embodiment. Process 1000 may be performed by one or more function schedulers (e.g., function scheduler 702 and/or function schedulers 772a-772M). For example, function schedulers 772a-772M, which may be coordinated by system controller 752, may perform process 1000 in parallel or simultaneously for PEs in respective functional units.

Process 1000 begins at 1002, at which a system (e.g., npFPGA) may be powered up. In some embodiments, all PEs of the system may be powered down (e.g., put in sleep mode) by default when the system is powered up. At 1004, a PE state table, which may be maintained in an embedded memory or register array, may be initialized. The PE state table may indicate the status (e.g., in wake mode, active, busy, unused, or in sleep mode) of one or more PEs in the system (e.g., all PEs of a functional unit).

At 1006, process 1000 may wait for a start signal. In some embodiments, a start signal may be received from a system controller (e.g., system controller 752). At 1008, it may be determined whether a start signal has been received. If not, process 1000 may loop back to 1006. If, at 1008, it is determined that a start signal has been received, process 1000 may proceed to 1010, at which it may be determined whether a task queue is empty. The task queue may be an output queue, and may be regulated by a functional unit, as discussed above with respect to FIG. 5. If, at 1010, it is determined that the task queue is empty, process 1000 may end at 1024.

If, at 1010, it is determined that the task queue is not empty, process 1000 may proceed to 1012, at which it may be determined whether all PEs are busy. The determination at 1012 may be made using a PE state table. For example, if the PE state table indicates that at least one PE is in an idle state, it may be determined at 1012 that not all PEs are busy. If, at 1012, it is determined that all PEs are busy, process 1000 may proceed to 1026, at which it may be determined whether a task queue overflow condition exists. If, at 1026, a task queue overflow condition is determined, process 1000 may proceed to 1014, at which a recover process may be initiated, and the process 1000 may end at 1024. If, at 1026, it is determined that the task queue is not in overflow condition, process 1000 may loop back to 1012. If all PEs are busy, process 1000 may loop between 1012 and 1026 until a free PE is available for task assignment.

If, at 1012, it is determined that not all PEs are busy, and the task queue is not in overflow condition, process 1000 may proceed to 1016, at which a free PE may be identified using the PE state table. At 1018, the identified free PE (i.e., the PE identified at 1016) may be set in wake mode. In some embodiments, the identified free PE may be connected to a power rail by closing a switch, as discussed above with respect to FIGS. 7A-B.

At 1020, a task from the task queue may be assigned to the identified free PE (i.e., the PE identified at 1016). At 1022, the PE state table may be updated to indicate a busy status for the identified PE that has been assigned a task (i.e., the PE that was assigned a task at 1020). Process 1000 may then loop back to 1010.

Figure 11:
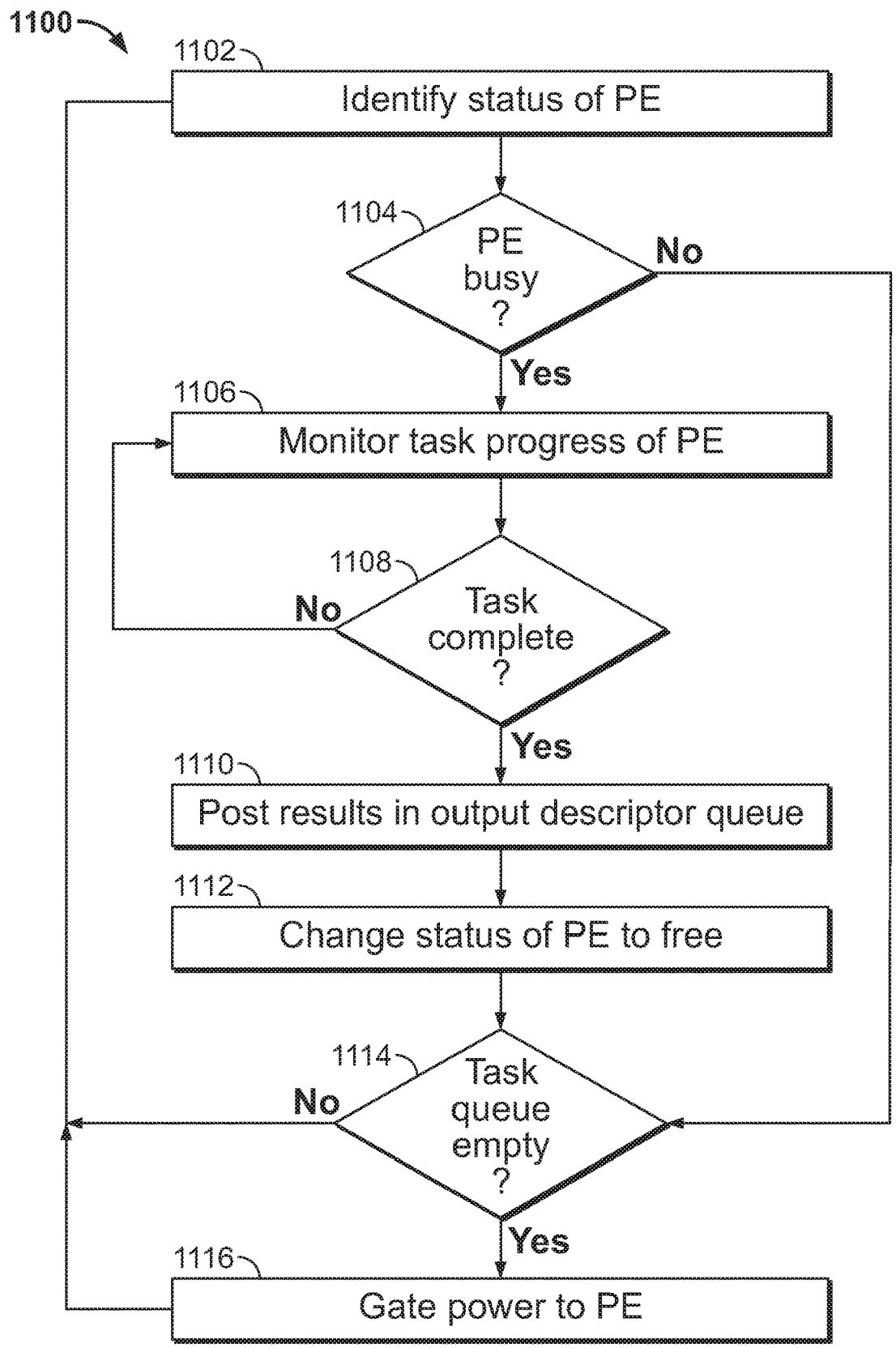
FIG. 11 shows an illustrative flow diagram of a process for using a PE state table to reduce power consumption of a multi-die device, according to an illustrative embodiment.

FIG. 11 shows an illustrative flow diagram of a process 1100 for using a PE state table to reduce power consumption of a multi-die device, according to an illustrative embodiment. Process 1100 may be used for logic level power gating, and may be performed by one or more function schedulers (e.g., function scheduler 702 and/or function schedulers 772a-772M) For example, function schedulers 772a-772M, which may be coordinated by system controller 752, may perform process 1100 in parallel for PEs in respective functional units.

At 1102, the status of a PE may be identified. In some embodiments, the status of the PE may be identified based on a PE state table, as discussed above with respect to FIG. 10. At 1104, it is determined whether the status of the PE is busy. If not, process 1100 may proceed to 1114. If so, process 1100 may proceed to 1106.

At 1106, the task progress of the PE may be monitored. At 1108, it may be determined whether the task is complete. If not, process 1100 may loop back to 1106. If, at 1108, it is determined that the task is complete, process 1100 may proceed to 1110, at which results may be posted in an output descriptor queue. The output descriptor queue may be an output queue, and the posting may be controlled by a functional unit, as discussed above with respect to FIG. 5.

At 1112, the status of the PE may be changed to free (e.g., in a PE state table). At 1114, it may be determined whether the task queue is empty. If not, process 1100 may loop back to 1102 so that another task may be assigned to a free PE. If, at 1114, it is determined that the task queue is empty, process 1100 may proceed to 1116, at which power to the PE may be gated. In some embodiments, power may be gated to all PEs in a functional unit that has not been assigned a task (e.g., PEs that are in an idle state) Process 1100 may then loop back to 1102.

It should be understood that one or more elements shown in processes 800, 900, 1000, or 1100 may be combined with other elements, performed in any suitable order, performed in parallel (e.g., simultaneously or substantially simultaneously), or removed. For example, elements 1110 and 1112 of process 1100 may be performed simultaneously, or in a different order than shown in FIG. 11. Processes 800, 900, 1000, and 1100 may be implemented using any suitable combination of hardware and/or software in any suitable fashion.

In some embodiments, register-based memories may use clock gating to reduce the power consumed by a multi-die device (e.g., npFPGA). In some embodiments, the registers in logic elements may use clock gating to reduce power consumption. User logic may control the clock gating window based on operational states of the function being implemented in the user logic.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. A multi-die network processor device, comprising:
   a network interface controller (NIC) die comprising NIC circuitry configured to implement an Ethernet media access control (MAC) protocol;
   a peripheral component interconnect express (PCIe) die comprising PCIe circuitry configured to implement a PCIe protocol; and
   a memory die configured to store network packets, wherein the NIC die, the PCIe, and the memory die are coupled to a single substrate of the multi-die network processor device and communicatively coupled using an interconnect, wherein the PCIe die is power gated for at least a portion of a first operation performed by the multi-die network processor device in response to the NIC die being used and the PCIe die being unused by the multi-die network processor device during at least the portion of the first operation, wherein the NIC die is power gated for at least a portion of a second operation in response to the PCIe die being used and the NIC die being unused by the multi-die network processor device during at least the portion of the second operation, and wherein the multi-die network processor device is configured to communicate network-related data via at least the NIC die during the first operation while the PCIe die is power gated when unused during the first operation and communicate via the PCIe die during the second operation while the NIC die is power gated when unused during the second operation.

2. The multi-die network processor device of claim 1, wherein the NIC circuitry comprises a soft intellectual property block, a hard intellectual property block, or any combination thereof.

3. The multi-die network processor device of claim 1, comprising a programmable die that comprises programmable fabric, wherein the programmable fabric is configured to implement a function on the network packets.

4. The multi-die network processor device of claim 3, wherein the function comprises a routing function, a quality of service function, or a forward error correction function.

5. The multi-die network processor device of claim 3, wherein the programmable die comprises the NIC die or the PCIe die.

6. The multi-die network processor device of claim 1, wherein the NIC circuitry comprises a 1×400G controller, a 4×100G controller, a 4×40G controller, or a 16×10G controller.

7. The multi-die network processor device of claim 1, wherein the PCIe circuitry comprises a PCIe Gen3×16 controller or a PCIe Gen4×16 controller.

8. The multi-die network processor device of claim 1, wherein the memory die comprises a hybrid memory cube (HMC), a parallel synchronous dynamic random-access memory (SDRAM), a double data rate (DDR)/quadruple data rate (QDR) static random-access memory (SRAM), or a ternary content-addressable memory (TCAM).

9. A multi-die line card device, comprising:
a first network interface controller (NIC) die comprising a first NIC circuitry configured to implement an Ethernet media access control (MAC) protocol;
a second NIC die comprising a second NIC circuitry configured to implement an Interlaken MAC protocol, the second NIC die different than the first NIC die; and
a first programmable logic circuitry comprising a user logic configured to implement a function on network traffic between the first NIC die and the second NIC die, wherein the first NIC die, the second NIC die, and the first programmable logic circuitry are coupled to a single substrate of the multi-die line card device and communicatively coupled using an interconnect, wherein the first NIC die, the second NIC die, or a combination thereof, are power gated for at least a portion of a first operation performed by the multi-die line card device in response to being unused by the multi-die line card device during at least the portion of the first operation, and wherein the multi-die line card is configured to communicate network-related data via the first NIC die when the second NIC die is power gated while unused during the at least the portion of the first operation and via the second NIC die when the first NIC die is power gated while unused during a second operation.

10. The multi-die line card device of claim 9, wherein the first programmable logic circuitry is comprised in the first NIC die or the second NIC die.

11. The multi-die line card device of claim 9, comprising a programmable die that comprises the first programmable logic circuitry.

12. The multi-die line card device of claim 9, wherein the function on the network traffic comprises a routing function, a quality of service function, or a forward error correction function.

13. The multi-die line card device of claim 9, wherein the first NIC circuitry comprises a 1×400G controller, a 4×100G controller, a 4×40G controller, or a 16×10G controller.

14. The multi-die line card device of claim 9, wherein the second NIC circuitry comprises a 16×12.5G Interlaken controller or 16×25G Interlaken controller.

15. The multi-die line card device of claim 9, wherein the first NIC circuitry comprises a first hard logic intellectual property (hard IP) and the second NIC circuitry comprises a second hard IP.

16. The multi-die line card device of claim 9, comprising a memory die coupled to the single substrate, wherein the memory die is configured to store network packets.

17. The multi-die line card device of claim 16, wherein the memory die comprises a hybrid memory cube (HMC), a parallel synchronous dynamic random-access memory (SDRAM), a double data rate (DDR)/quadruple data rate (QDR) static random-access memory (SRAM), or a ternary content-addressable memory (TCAM).

18. A multi-die line card device, comprising:
a first network interface controller (NIC) die comprising a first NIC circuitry configured to implement an Optical Transport Network (OTN) protocol;
a second NIC die comprising a second NIC circuitry configured to implement an Interlaken protocol; and
a memory die configured to store network packets, wherein the first NIC die, the second NIC die, and the memory die are coupled to a single substrate of the multi-die line card device and communicatively coupled using an interconnect, wherein the first NIC die, the second NIC die, or a combination thereof, are power gated for at least a portion of a first operation performed by the multi-die line card device in response to the memory die being used and the first NIC die, the second NIC die, or the combination thereof, being unused by the multi-die line card device during the at least the portion of the first operation, and wherein the memory die is power gated for at least a second or third portion of the operation in response to the first NIC die, the second NIC die, or the combination thereof, being used and the memory die being unused by the multi-die line card device during at least a portion of a second or a third operation, and wherein the multi-die line card is configured to communicate network-related data via the first NIC die when the second NIC die is power gated while unused during the at least the portion of the second operation or the third operation and via the second NIC die when the first NIC die is power gated while unused during the at least portion of the third operation while the first NIC die or the second NIC die is power gated.

19. The multi-die line card device of claim 18, wherein the memory die comprises a hybrid memory cube (HMC), a parallel synchronous dynamic random-access memory (SDRAM), a double data rate (DDR)/quadruple data rate (QDR) static random-access memory (SRAM), or a ternary content-addressable memory (TCAM).

20. The multi-die line card device of claim 18, wherein the first NIC circuitry comprises a soft intellectual property block, a hard intellectual property block, or any combination thereof.

21. The multi-die line card device of claim 18, comprising a programmable die that comprises programmable fabric, wherein the programmable fabric is configured to implement a function on the network packets.

22. The multi-die line card device of claim 21, wherein the function comprises a routing function, a quality of service function, or a forward error correction function.

23. The multi-die line card device of claim 18, wherein the second NIC circuitry comprises a 16×12.5G Interlaken controller or 16×25G Interlaken controller.

* * * * *